(12) United States Patent
Panther et al.

(10) Patent No.: US 9,020,619 B2
(45) Date of Patent: Apr. 28, 2015

(54) METHOD AND APPARATUS FOR LOCAL OR REMOTE CONTROL OF AN INSTRUMENT IN A PROCESS SYSTEM

(75) Inventors: Mitchell Stephen Panther, Marshalltown, IA (US); Kurtis Kevin Jensen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 449 days.

(21) Appl. No.: 13/454,706

(22) Filed: Apr. 24, 2012

(65) Prior Publication Data
US 2013/0282150 A1    Oct. 24, 2013

(51) Int. Cl.
*G05B 19/18* (2006.01)
*G05B 19/042* (2006.01)
*G05B 11/01* (2006.01)

(52) U.S. Cl.
CPC .................... *G05B 19/042* (2013.01)

(58) Field of Classification Search
CPC ................................................. G05B 19/042
USPC ....................... 700/2–5, 19–20, 65–66, 72–75
See application file for complete search history.

(56) References Cited

U.S. PATENT DOCUMENTS

| | | | |
|---|---|---|---|
| 4,149,237 A | 4/1979 | Freitas | |
| 5,884,072 A * | 3/1999 | Rasmussen | 709/223 |
| 7,869,889 B2 * | 1/2011 | Flanders et al. | 700/79 |
| 2006/0291438 A1 | 12/2006 | Karschnia et al. | |
| 2008/0198036 A1 * | 8/2008 | Songkakul et al. | 340/825.22 |
| 2009/0059814 A1 * | 3/2009 | Nixon et al. | 370/254 |
| 2010/0004761 A1 * | 1/2010 | Flanders et al. | 700/28 |
| 2013/0049984 A1 * | 2/2013 | Harper, Jr. | 340/870.02 |
| 2013/0223494 A1 * | 8/2013 | Jensen et al. | 375/224 |
| 2013/0227575 A1 * | 8/2013 | Jensen et al. | 718/102 |
| 2014/0249653 A1 * | 9/2014 | Blevins et al. | 700/21 |
| 2014/0249654 A1 * | 9/2014 | Blevins et al. | 700/21 |

OTHER PUBLICATIONS

International Search Report and Written Opinion for Application No. PCT/US2013/037343, dated Aug. 9, 2013.
International Preliminary Report on Patentability and Written Opinion for International Application No. PCT/US2013/037343, dated Oct. 28, 2014 (7 pages).

* cited by examiner

*Primary Examiner* — Ramesh Patel
(74) *Attorney, Agent, or Firm* — Marshall, Gerstein & Borun LLP

(57) ABSTRACT

Example methods and apparatus to a controller of a local control loop having a field device and a sensor configured in a closed-loop control system are disclosed. The controller is wirelessly coupled to a control system wherein the controller and the control system execute complementary control over the field device.

14 Claims, 11 Drawing Sheets

METHOD AND APPARATUS FOR LOCAL OR REMOTE CONTROL OF AN INSTRUMENT IN A PROCESS SYSTEM

FIELD OF THE DISCLOSURE

This disclosure relates generally to process control systems and, more particularly, to a method and apparatus to configure a control environment for a field instrument in a control system.

BACKGROUND

Process control systems have been implemented for many years and across various industries. In petroleum processing, power generation, and chemical manufacturing, process control systems have been utilized to varying degrees, from small control systems having a few input/output (I/O) nodes to vastly larger systems having hundreds, and even thousands, of the field instruments and devices, such as, for example, valves, louvers, regulators, displacement and float level sensors, relief valves, and alarms.

In many process control systems, it is common to have one or more field devices implemented in a stand-alone snap-acting application. In this configuration, the field device is essentially separate from the control system in that the field device can only be controlled or monitored by control system personnel at the site of the field device. The secluded or remote field device is considered to be operating "blind," as the device does not provide feedback to the process control system pertaining to operating information. Such feedback, may typically consist of, for example, the actual position of a valve or other information regarding the valve.

In the past, these "blind," field devices which often are situated in remote locations, were typically controlled via a pneumatic or hydraulic controller. Pneumatic controllers tend to be well suited for the automation of simple repetitive tasks. However, such controllers may be subject to mechanical fatigue and deterioration, which can adversely affect both the accuracy and the repeatability of the process control system, either of which may ultimately lead to failure of the control system. It would therefore be beneficial to have a field device that can be remotely controlled and/or monitored, so the process control system can more readily assess the operating condition of the field device.

Figure 1:
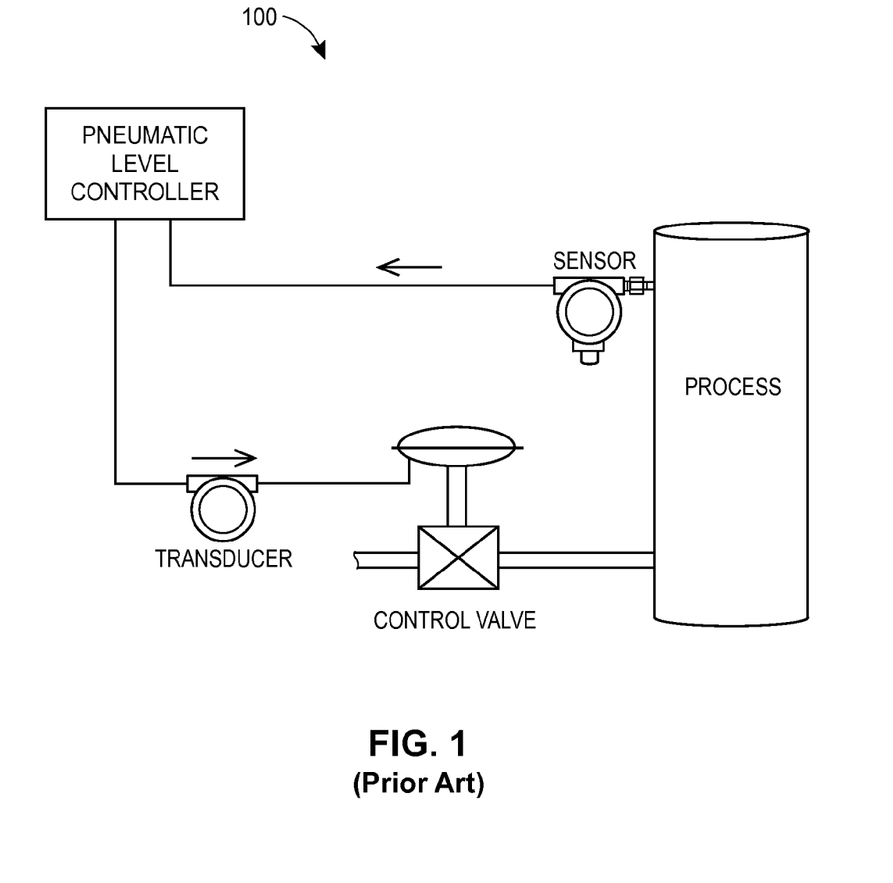
FIG. 1 is a block diagram of an existing snap-acting control loop.

FIG. 1 depicts a common configuration of a local control loop in a stand-alone application. An event trigger associated with the process is monitored by a sensor such as, for example, a pressure switch, a micro switch, a limit switch, or other suitable devices. The sensor is connected to the controller, and in response to an occurrence of the event trigger, the sensor alerts the controller. In turn, the controller energizes an actuator or transducer associated with the field device to adjust the process. For example, the controller may cause the transducer or actuator to move a control valve, flip a switch, or raise or lower a temperature or pressure associated with the process.

Initially, pneumatic control systems did not incorporate programmable logic controllers (PLC) or any electrical/electronic controllers. Control systems eventually utilized digital logic with the incorporation of solid-state devices, programmable logic arrays (PLAs), PLCs, and microprocessors and microcontrollers. With the advent of such electronic control systems, it became possible to remotely monitor and control field devices via wired-communication between the controller and the field device.

Figure 2:
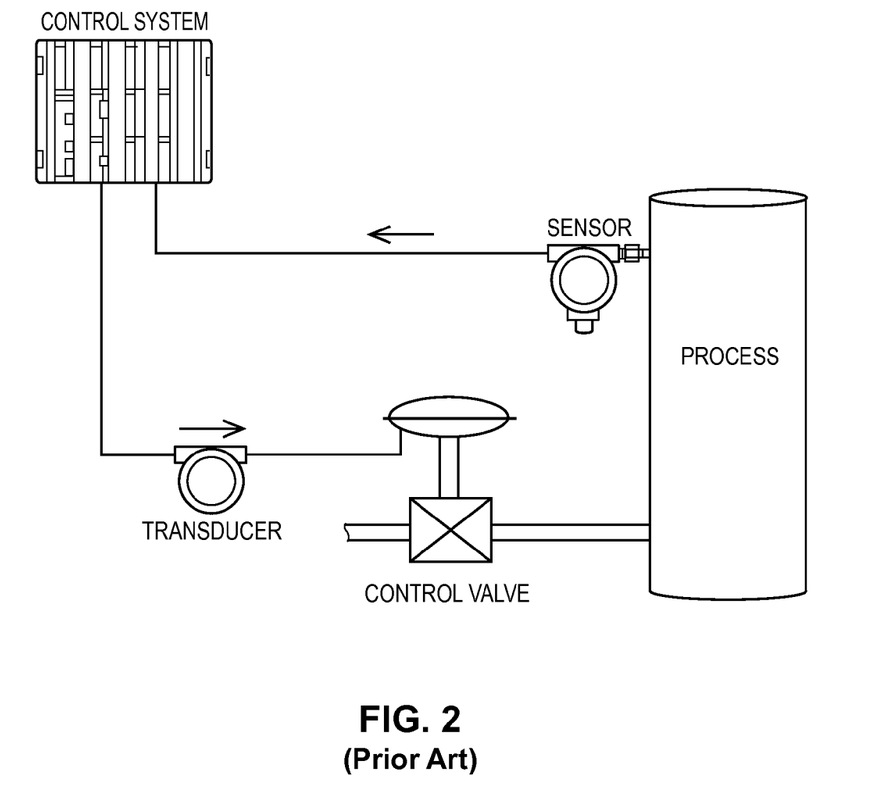
FIG. 2 is a block diagram of an existing control loop utilizing a control system.

If there was a desire to remotely monitor the field device of a stand-alone control loop such as that shown in FIG. 1, the sensor and field device could be wired to the electronic control system. Such a configuration is show in FIG. 2 wherein the local control loop of FIG. 1 utilizes a control system. In this arrangement, a process value or variable is sent from the sensor to the control system via a communication protocol such as Fieldbus™. The control system then determines a set-point (for example, an operational parameter) and sends a control signal over a communication bus to the field device to control the process. Thus, responsibility for monitoring and controlling the stand-alone field device was relocated from the site of the field device to a distant or remote control system.

One concern with wire-coupling a control loop to a control system is the cost and effort associated with the actual wiring of the system. Often times it simply is not feasible to hard-wire a control loop to a control system because of the distance, inhospitable terrain, dangerous environment, or easement restrictions between the two locations. Another concern is the increase in time involved to control the remotely connected field device as compared to the initial stand-alone configuration and its snap-acting operation. That is, the time required to send a control response to the wired field device includes time for sending the sensed process value to the remote control system, processing the sensed value at the controller, and sending the control command back to the remotely located control element, as well as the time it takes for the control element to react. This increase in time may adversely affect the ability of the system to control processes where the monitored variable changes quickly.

Figure 3:
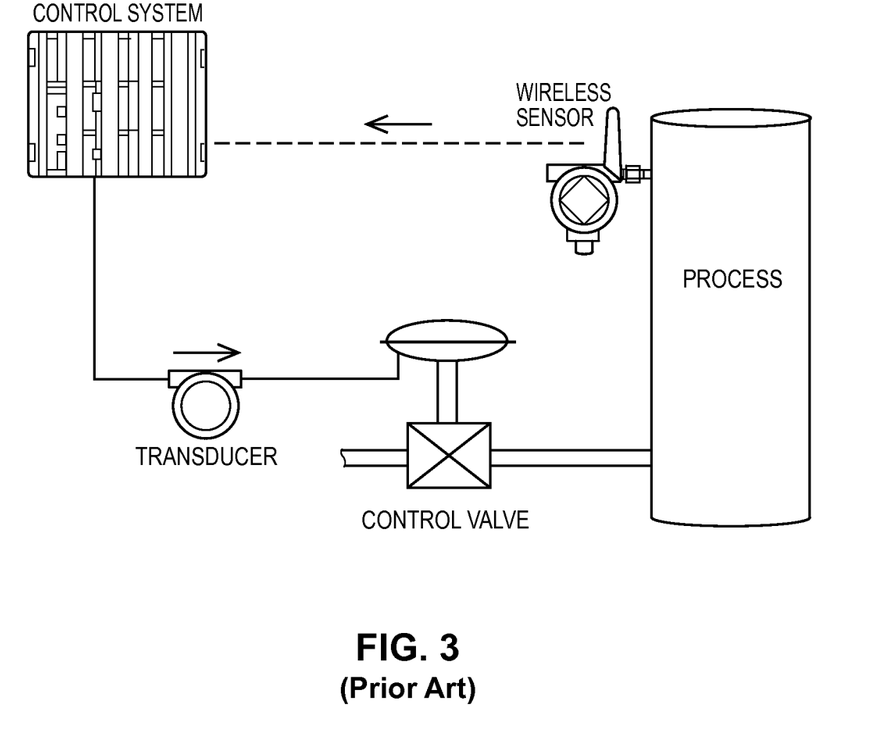
FIG. 3 is a block diagram of an existing control loop utilizing a control system wherein the sensor is wirelessly coupled to the control system.

To lessen the cost and complexity associated with wiring remote field devices to the control system, some portions of the control process were modified for wireless communication. A typical implementation of a wireless sensor is shown in FIG. 3, wherein the wiring between the sensor and the control system shown in FIGS. 1 and 2 has been replaced with wireless capability. This modification however does not address the concerns that arise relating to the associated increase in time to control the field device compared with respect to the snap-acting configuration. On the contrary, because the wireless sensor in many cases is battery powered, the rate of transmission from the wireless sensor to the control system is usually reduced to conserve the battery. The minimized transmissions of the sensor value to the control system unfortunately may further extend the time needed to control the process as compared to systems utilizing wired sensors.

In view of the above concerns that need to be addressed for remotely controlling and/or monitoring a field device, it is not difficult to understand why many field devices remain configured in stand-alone applications. Controlling such field devices therefore still requires control personnel to visit the site of the field device, which may be located in a harsh or hazardous environment, to modify or adjust the state, position, or other operating parameters of the field device.

SUMMARY

Example apparatus and methods to control a field device set apart from a process control system are described herein. In one example embodiment, a process control system for controlling a process includes a field device coupled to the process and arranged to control a process condition. A wireless sensor is coupled to the process and arranged to monitor the process for the occurrence of an event trigger associated with the process condition. A remote control system is disposed remotely from the field device and includes a first controller, a first memory, a first processor, and a first wireless communication module. The first wireless communication module is coupled to the first processor and permits wireless communication between the first controller and the wireless sensor. The remote control system may further include a first control module stored on the first memory and coupled to the first processor. The first control module is capable of being executed on by the processor to permit the first controller to place the field device at a first set-point to control the process condition. A local control system is disposed locally relative to the field device and includes a wireless output device. The wireless output device includes a local controller, a local memory, a local processor, and a local wireless communication module coupled to the local processor and arranged to permit wireless communication between the local controller and the first controller. A local control module is stored on the local memory and coupled to the local processor. The local control module is capable of being executed on by the local processor to permit the local controller to place the field device at a local set-point. The first controller may be further arranged to configure the local control module to permit adjustment of the local set-point.

If desired, the wireless output device may include a user interface having at least one input coupled to the local processor and at least one output coupled to the local processor. The input may include a keypad, keyboard, push-button, etc., and the output may include a display device, such as a screen, LED, audio speaker, etc.

In another example embodiment of a process control system for controlling a process, the process control system includes a field device coupled to the process and arranged to adjust a process condition. A wireless sensor is coupled to the process and arranged to monitor the process for the occurrence of an event trigger associated with the process condition. A local control loop is operatively coupled to the field device and includes a local controller having a local wireless communication module coupled to the wireless sensor. The local controller further includes a local processor, a local memory, and a local control module. The local control module may be stored on the local memory and may be capable of being executed on by the local processor. The local control loop may be arranged to operate in a local control mode in which the local controller monitors the wireless sensor and places the field device at a local set-point determined by the local control module. A remote control loop is operatively coupled to the field device and includes a remote controller having a remote wireless communication module coupled to the local wireless communication module of the local controller to facilitate wireless communication between the remote control loop and the local control loop. The remote control loop also includes a remote processor, a remote memory, and a remote control module. The remote control module may be stored on the remote memory and may be capable of being executed on by the remote processor. The remote control loop may be arranged to operate in a remote control mode in which the remote controller monitors the wireless sensor and places the field device at a remote set-point determined by the remote control module. The remote control loop may further be arranged to configure the local control module to remotely alter the local set-point.

In a further example embodiment, a control device for controlling a field device, and capable of being coupled to a control system, stores machine accessible instructions in a memory. When executed, the instructions cause the control device to wirelessly communicate with the control system and may also cause the control device to monitor a process condition of the field device, coordinate complementary control of the field device between the control device and the control system, and transmit a control signal to the field device.

DETAILED DESCRIPTION

Generally speaking, a control system includes a controller that is configured to respond to a target or an event trigger associated with a process condition. The process condition is monitored, typically via a sensor coupled to the process, for the occurrence of the event trigger. Upon the occurrence of the event trigger, the sensor may provide an indication of the occurrence to the controller. The controller may then record corresponding information associated with the occurrence of the event trigger, such as the date and time of the occurrence, and/or the controller may respond by transmitting a control value to adjust a parameter of an associated field device to control the process.

Figure 4:
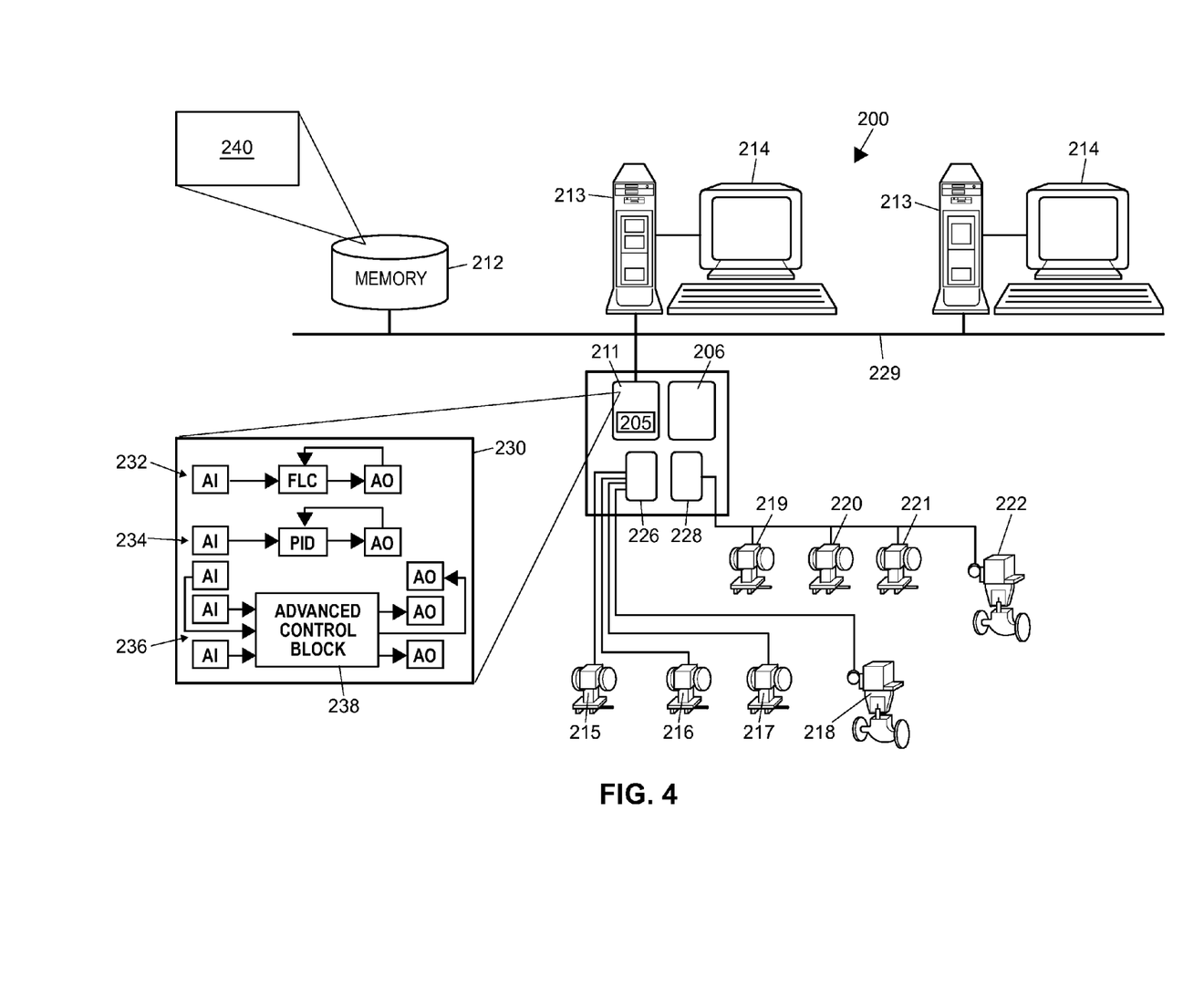
FIG. 4 is a block diagram of an example process control system assembled in accordance with the teachings of the present invention and used to remotely monitor and/or control a field device or local control loop.

FIG. 4 depicts an example process control system 200 having a system or process controller 211 communicatively connected to a memory 212 including a data collection unit and one or more host workstations or computers 213 (which may be any type of personal computers, workstations, etc.), each having an output display screen 214. The memory 212 may include any desired type of memory and any desired or known software, hardware, or firmware for storing data and may be separate from (as illustrated in FIG. 4) or a part of one of the workstations 213.

The controller 211, which may be, by way of example, a FIELDVUE® DVC sold by Emerson Process Management, is communicatively connected to the host computers 213 and to the memory 212 via, for example, an Ethernet connection or any other desired communication network 229. The communication network 229 may be in the form of a local area network (LAN), a wide area network (WAN), a telecommunications network, etc. The control system 200 also includes at least one processor 205 that is coupled to a wireless communication module 206, which facilitates wireless communication to and from the control system 200.

The controller 211 is communicatively connected to field devices 215-222 via input/output (I/O) cards or devices 226 and 228 and using any desired hardware and software associated with, for example, standard 4-20 ma devices and/or any smart communication protocol such as the FOUNDATION® Fieldbus protocol (Fieldbus), the HART protocol, etc. The field devices 215-222 may be any types of devices, such as valves, valve positioners, switches and transmitters (for example, temperature, pressure and flow rate sensors), and perform functions within the process such as opening or closing valves and measuring process parameters. The I/O cards 226 and 228 may be any types of I/O devices conforming to any desired communication or controller protocol.

In the example embodiment illustrated in FIG. 4, the field devices 215-218 are standard 4-20 ma devices that communicate over analog lines to the I/O card 226 while the field devices 219-222 are smart devices, such as Fieldbus field devices, that communicate over a digital bus to the I/O card 228 using Fieldbus protocol communications. The field devices 215-222 of course may conform to any other desired standard(s) or protocols, including any standards or protocols developed in the future.

The controller 211 communicates with the devices 215-222, the host computers 213, and the memory 212 to control a process in any desired manner. The controller 211, which may be one of many controllers distributed within the plant, implements or oversees one or more process control routines. The process control routines typically include control modules, which may be one or more control loops, or control routines, and which may be stored in the memory 212 and executed on by the processor 205. For the purpose of this description, a process control element can be any part or portion of a process control system including, for example, a routine, a block, or a control module stored on any computer readable storage medium.

Control routines, which may be control modules or any part of a control procedure such as a subroutine, parts of a subroutine (such as lines of code), etc., may be implemented in any desired software format, such as using ladder logic, sequential function charts, control routine diagrams, object oriented programming or any other software programming language or design paradigm. Likewise, the control routines described herein may be hard-coded into, for example, one or more EPROMs, EEPROMs, application specific integrated circuits (ASICs), PLCs, or any other hardware or firmware elements. The control routines may be designed using any design tools, including graphical design tools or any other type of software/hardware/firmware programming or design tools.

The controller 211 may be configured to implement a control routine or a control strategy in any desired manner. For example, the controller 211 may implement a control strategy using what are commonly referred to as function blocks, wherein each function block is a part or object of an overall control routine and operates in conjunction with other function blocks (via communications called links) to implement process control loops within the process control system 200. Function blocks typically perform one of: an input function such as that associated with a transmitter, a sensor, or other process parameter measurement device; a control function such as that associated with a control routine that performs PID, fuzzy logic, etc. control; or, an output function that controls the operation of some device such as a valve to perform some physical function within the process control system 200. Hybrids of these function blocks, as well as other types of function blocks, may also exist. While the description of the control system is provided herein using a function block control strategy that incorporates an object oriented programming paradigm, the control strategy or control routines or control loops or control modules could also be implemented or designed using other conventions, such as ladder logic, sequential function charts, etc., or using any other desired programming language or paradigm.

The function blocks and control routines may be stored in and executed on by the controller 211, which is typically the case when these function blocks are used for, or are associated with, standard 4-20 ma devices and some types of smart field devices such as HART devices. The function blocks and control routines may also be stored in and implemented by the field devices themselves, which may be the case with Fieldbus devices.

For the purposes of this disclosure, the terms control strategy, control routine, control module, control function block, and control loop essentially denote a control program executed to control the process and these terms may be interchangeably used herein. However, for the purposes of the following discussion, the term control module will be used. It should further be noted that module described herein may have parts thereof implemented or executed on by different controllers or other devices if so desired. In addition, the control modules described herein to be implemented within the process control system 200 may take any form, including software, firmware, hardware, etc.

As illustrated by the expanded block 230 of FIG. 4, the controller 211 may include or implement a number of single-loop control modules, illustrated as control modules 232 and 234, and may implement one or more advanced control loops, illustrated as control module 236. The single-loop control modules 232 and 234 are illustrated as performing single loop control using a single-input/single-output fuzzy logic control block and a single-input/single-output PID control block, respectively, connected to appropriate analog input (AI) and analog output (AO) function blocks, which may be associated with process control devices such as the field devices 215-222.

The advanced control module 236 is illustrated as including a multivariable control module 238 having inputs communicatively connected to numerous AI function blocks and outputs communicatively connected to numerous AO function blocks, although the inputs and outputs of the multivariable control block 238 may be communicatively connected to any other desired control module to receive other types of inputs and to provide other types of control outputs. In general, the process may receive one or more inputs that may include manipulated variable (MV) inputs (also referred to as control inputs), measurable disturbance variable (DV) inputs, and un-measured disturbance variable (XV) inputs. The process may operate based on the MV, DV, and XV inputs provided thereto to produce process outputs signals or controlled variable (CV) signals. It will be understood that the control modules 232, 234, 236, and 238 illustrated in FIG. 4, may be executed on by the controller 211 or, alternatively, may be located in and executed on by any other processing device, such as one of the workstations 213 or, as will be described later, in complementary coordination with a wireless output device 352.

Figure 5:
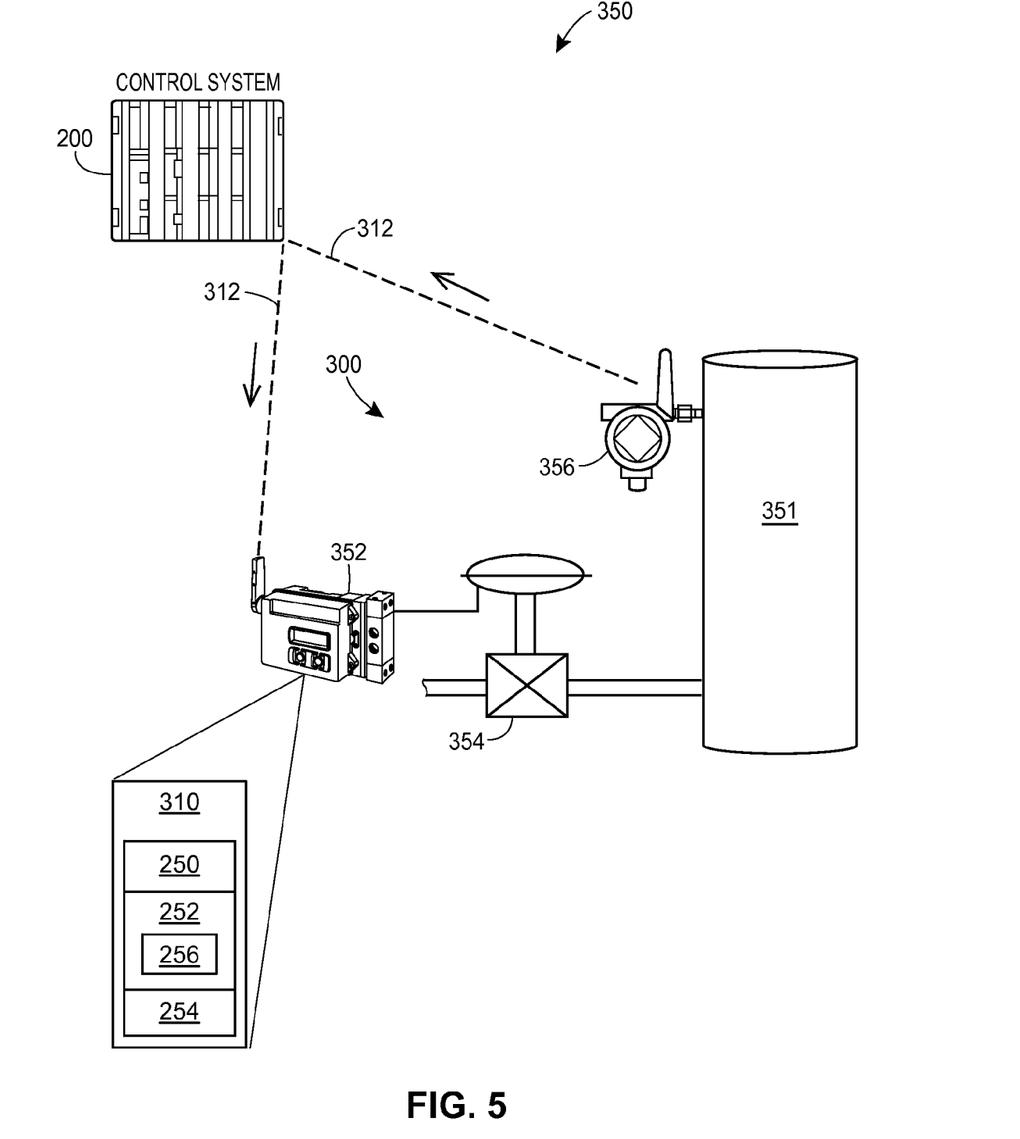
FIG. 5 is a block diagram of one example embodiment of a process control system assembled in accordance with the teachings of the present invention and used to remotely monitor and/or control a field device or control loop.

FIG. 5 is an illustration of a process control system 350 assembled in accordance with a first disclosed example of the present invention in the form of a fluid level control process. Upon reading the present disclosure however, those of skill in the relevant art will readily understand that any of processes discussed herein with respect to any of the described embodiments may take the form of any one of numerous processes typically found in a process plant system, such as, for example, fluid flow rate, valve position, temperature, pressure, etc. In this example embodiment, a fluid level of a holding tank is monitored by a sensor and should the fluid level exceed a prescribed limit, the event trigger may be realized and the sensor will indicate to a controller the occurrence of the event trigger. Upon becoming aware of the event trigger, the controller may respond by sending a control value to an associated field device such as a drain valve wherein the valve will be actuated to open the drain so that the fluid level will return below the prescribed limit.

The process control system 350 is operatively coupled to the process 351 and to a field device 354, which is also coupled to the process 351 for controlling a process condition associated with the process 351. The process control system 350 includes a wireless sensor 356 coupled to the process 351 and arranged to monitor the process 351 for the occurrence of the event trigger associated with the process condition. The remote control system 200 earlier described in FIG. 4 is disposed remotely from the field device 354, with the remote control system 200 including a controller, a memory, a processor, and a wireless communication module. In the example shown, the controller, the memory, the processor, and the wireless communication module may be the controller 211, the memory 212, the processor 205, and the wireless communication module 206 discussed previously with respect to the control system 200 of FIG. 4. The control module 240 is capable of being executed on by the processor 205 to permit the controller 211 to place the field device 354 at a first set-point to control the process condition.

The process control system 350 also includes a local control system 300 disposed locally relative to the field device 354. The local control system 300 includes a wireless output device 352. The wireless output device includes a local controller 310, a local memory 252, a local processor 250, and a local wireless communication module 254 coupled to the local processor 250 and arranged to permit wireless communication between the local controller 310 and the controller 211 of the remote control system 200. The local control system 300 includes a local control module 256 stored on the local memory 252 and coupled to the local processor 250 The local control module 256 is capable of being executed on by the local processor 250 to permit the local controller 310 to place the field device 354 at a local set-point. The controller 211 of the remote control system 200 may be arranged to configure the local control module 256 to permit adjustment of the local set-point.

Set-points are positions in which the field device 354 may be configured. For example, the set-points of a valve may be the various positions that the valve may be configured, such as, fully opened, fully closed, or some position in between. Control values are sent from the controller, either the remote controller 211 or the local controller 310, to configure the set-point of the field device 354. Changes in the set-point may be made in response to the current process condition as compared to the expected process condition. For instance, if a liquid holding tank is not allowed to exceed a specified limit, control steps will be taken to ensure that from happening. The sensor will monitor the level of the fluid in the holding tank and report to the process controller the current status. Upon the occurrence of the event trigger, that is the specified limit of the liquid level being reached, the sensor will notify the process controller. The process controller may then send a control value to the field device to adjust the process.

Figure 10:
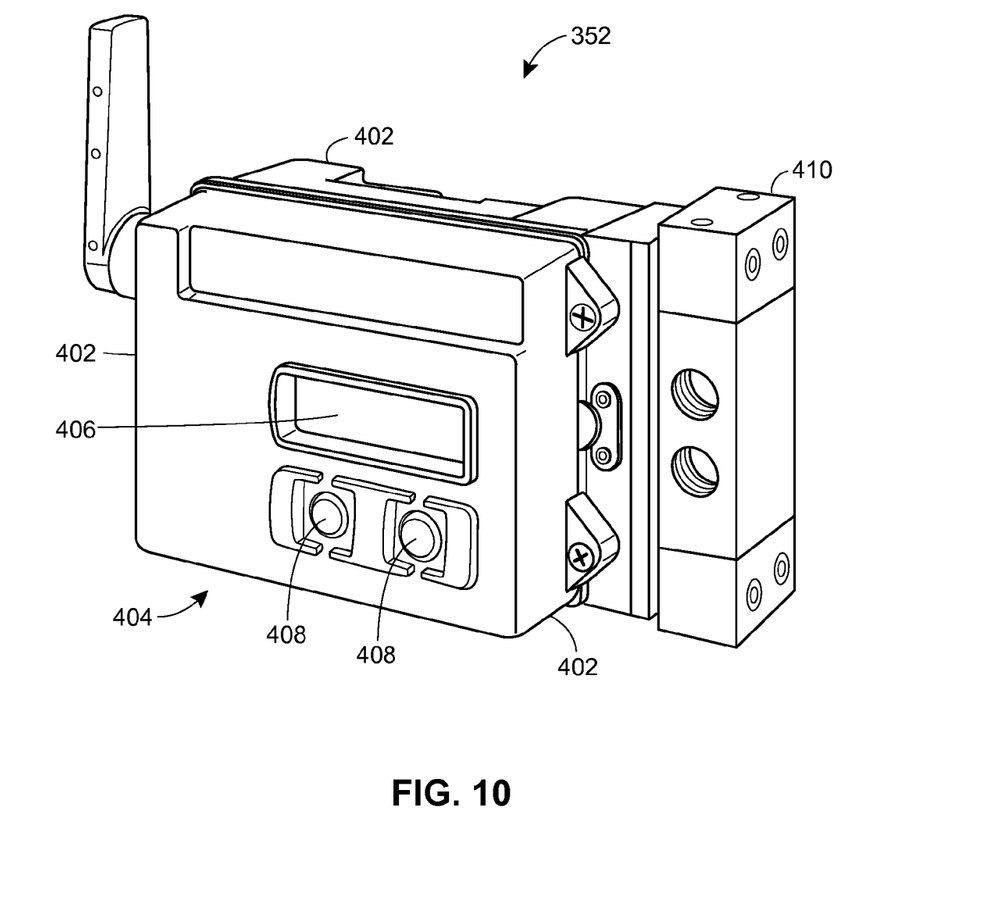
FIG. 10 illustrates an example of a wireless output device including a processor, control module, sensor, memory, and control output.

As can be seen in FIG. 10, and will be described in further detail below, the wireless output device 352 may include at least one input 408 and at least one output 406, both of which are coupled to the local controller 310. It is through the input 408 and output 406 that a user may manually configure the local set-point of the field device 354. In particular, the input 408 may be a keyboard, keypad, button, etc. wherein text or symbols may be entered to communicate with the local controller 310, or directions may be entered to navigate a menu tree within the local controller 310, to select a control module stored in memory for use in the control system. The output 406 may be a display device of some type such as a video screen, LED, or audio speaker capable of communicating information to a user.

In operation, the process control system 350 shown in FIG. 5 controls the process 351 by having the remote control system 200 receive information associated with the condition of the process 351 from the wireless sensor 356. Wireless communication 312 involving the process control system 350 may be accomplished through any known operable means, for example, Highway Addressable Remote Transducer Protocol (HART), etc. Use of frequency hopping technologies and anti-jamming technology with 128-bit AES encryption, key rotation, authentication, and verification may also be implemented to ensure protection of data and control.

The wireless sensor 356 monitors the level of fluid in the holding tank and may provide the control system 200 with the related information. The wireless sensor 356 may transmit a periodic signal to the remote control system 200 advising of the process condition 351. When the event trigger occurs, the wireless sensor 356 may send a signal to the remote control system 200 alerting of the occurrence of the event trigger. The remote control system 200 may process the received signal, after which a control value may be sent to the wireless output device 352, which may subsequently activate an actuator associated with the field device 354 to adjust the set-point of an operating parameter, such as the position of a valve.

The control system assembled in accordance with the teaching of the example embodiment depicted in FIG. 5 may reduce or eliminate the wiring infrastructure, and associated costs, previously required between the remote control system and the field device of the control system. In addition, the control system of FIG. 5 may provide the ability to remotely control an initially implemented stand-alone control loop that was previously thought to be too difficult or burdensome to connect to the control system and control remotely. Another benefit that may be provided is the ability to change the operating parameter set-point of the field device 354 via the remote control system 200 and the first set-point, and/or the wireless output device 352 and the local set-point.

Figure 6:
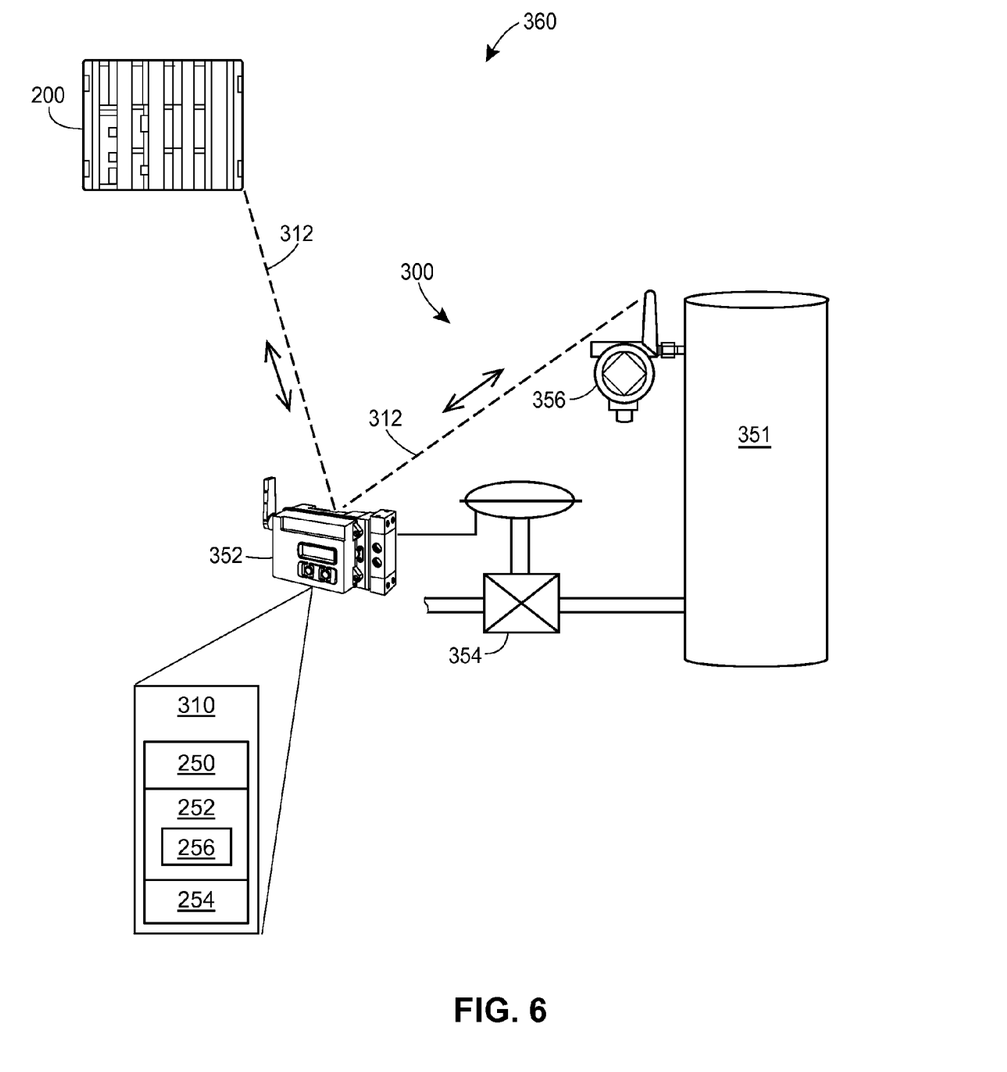
FIG. 6 is a block diagram of a second example embodiment of a process control system assembled in accordance with the teachings of the present invention and used to remotely monitor and/or control a field device or control loop.

Turning now to a second example embodiment of the present invention shown in FIG. 6, a simplified block diagram reveals several similar process control elements utilized in the first embodiment shown in FIG. 5, however the process control elements are arranged in a slightly different configuration. In particular, the field device 354 is coupled to the process 351 and arranged to adjust the process condition. The wireless sensor 356 is coupled to the process 351 and arranged to facilitate monitoring of the process for the occurrence of the event trigger associated with the process condition. A local control loop 300 is operatively coupled to the field device 354 and includes a local controller having a local wireless communication module coupled to the wireless sensor. The local controller further including a local processor, a local memory, and a local control module. In the example embodiment shown in FIG. 6, the local controller, local wireless communication module, local processor, local memory, and local control module may be the local controller 310, local wireless communication module 254, local processor 250, local memory 252, and local control module 256 discussed previously with respect to the local control system 350 of FIG. 5. The local control module 256 is stored on the local memory 252 and capable of being executed on by the local processor 250. The local control loop 300 may be arranged to operate in a local control mode in which the local controller 310 monitors the wireless sensor 356 and places the field device 354 at a local set-point determined by the local control module 256.

The embodiment(s) described above provide control system personnel with additional flexibility and control over the control system. In particular, sharing of a remote control loop is operatively coupled to the field device 354 and includes a remote controller having a remote wireless communication module coupled to the local wireless communication module 254 of the local controller 310 and facilitating wireless communication 312 between the remote control loop and the local control loop 300. In the example embodiment shown in FIG. 6, the remote control loop, remote controller, remote wireless communications module, may be the remote control system 200, remote controller 211, and remote wireless communications module 206 discussed previously with respect to FIG. 4. The remote control loop 200 may similarly further include the remote processor 205, the remote memory 212, and the remote control module 240. The remote control module 240 may be stored on the remote memory 212 and may be capable of being executed on by the remote processor 211. The remote control loop 200 may be arranged to operate in a remote control mode in which the remote controller 211 monitors the wireless sensor 356 and places the field device 354 at a remote set-point determined by the remote control module 240. The remote control loop 200 may further be arranged to configure the local control module 256 to remotely alter the local set-point.

In operation, the process control system 360 shown in FIG. 6 controls the process 351 by having the local controller 310 of the wireless output device 352 receive information associated with the condition of the process 351 from the wireless sensor 356. Similar to the example embodiment described in FIG. 5, the wireless sensor 356 monitors the level of fluid in the holding tank and may periodically provide the control system 360 with the related information. Instead of transmitting sensor information to the remote control system 200 as in FIG. 5 however, the wireless sensor 356 of the embodiment shown in FIG. 6 transmits the information related to the process condition directly to the wireless output device 352. The wireless output device 352 receives the information from the wireless sensor 356, processes the information, and may subsequently transmit a control value to activate an actuator associated with the field device 354 to adjust the set-point of an operating parameter, such as the position of its valve.

Wirelessly coupling the output device 352 with the control system 200 and its system controller 211 in the manner shown in FIG. 6 may provide the ability for wireless devices, such as the sensor 356 and wireless output device 352, to communicate with each other directly and exchange process operating information. This configuration may further provide control system personnel with an ability to change the user settings, override valve control and/or monitored positions, etc., of the field device 354 from the control system 200 as well as from the wireless output device 352. In other words, the wireless output device 352 and its local controller 310, may be solely responsible for controlling the local control loop 300, or the remote control system 200 and its controller 211 may be solely responsible for controlling the local control loop 300.

Additionally, the wireless output device 352 and the system controller 211 may share responsibility for controlling the local control loop 300, or may complement each other in controlling the local control loop 300. As such, operating parameters of the field device 354 such as a set-point parameter may be modified or monitored from the wireless output device 352 or from the system controller 211 without the need for control personnel to be physically near the site of the local control loop 360.

In this configuration, both the remote system controller 211 and the wireless output device 352 have the ability to control and/or monitor the local control loop process 360. That is, the control system 200 and the wireless output device 352 complement each other to control and adjust parameters associated with the field device 354. Thus, changes to the parameters of the field device 354 may be made from either the controller 211 or the wireless output device 352. So, whereas initially, control of the local control loop 300 may have been the sole responsibility of the wireless output device 352, control of the local control loop 300 may now be complemented by, or shared with, the control system 200 and its controller 211. Similarly, monitoring of the process may be shared between the control system 200 and the wireless output device 352.

Although the system controller 211 may execute control of the field device 354, the wireless coupling between the controller 211 of the control system 200 and the wireless output device 352 is not merely a replacement for traditionally hardwired configurations. That is, the control processing being performed in FIG. 6 is not in a traditional control system manner, but rather in a field device manner. In other words, because the wireless output device 352 may also control the field device 354, process variables and output commands need not be sent to and from the control system controller 211. Therefore, less frequent communication to and from the control system 200 may be required and a significant reduction in process communication may result, which may improve control of the field device 354 by enabling faster responses to process changes.

Figure 7:
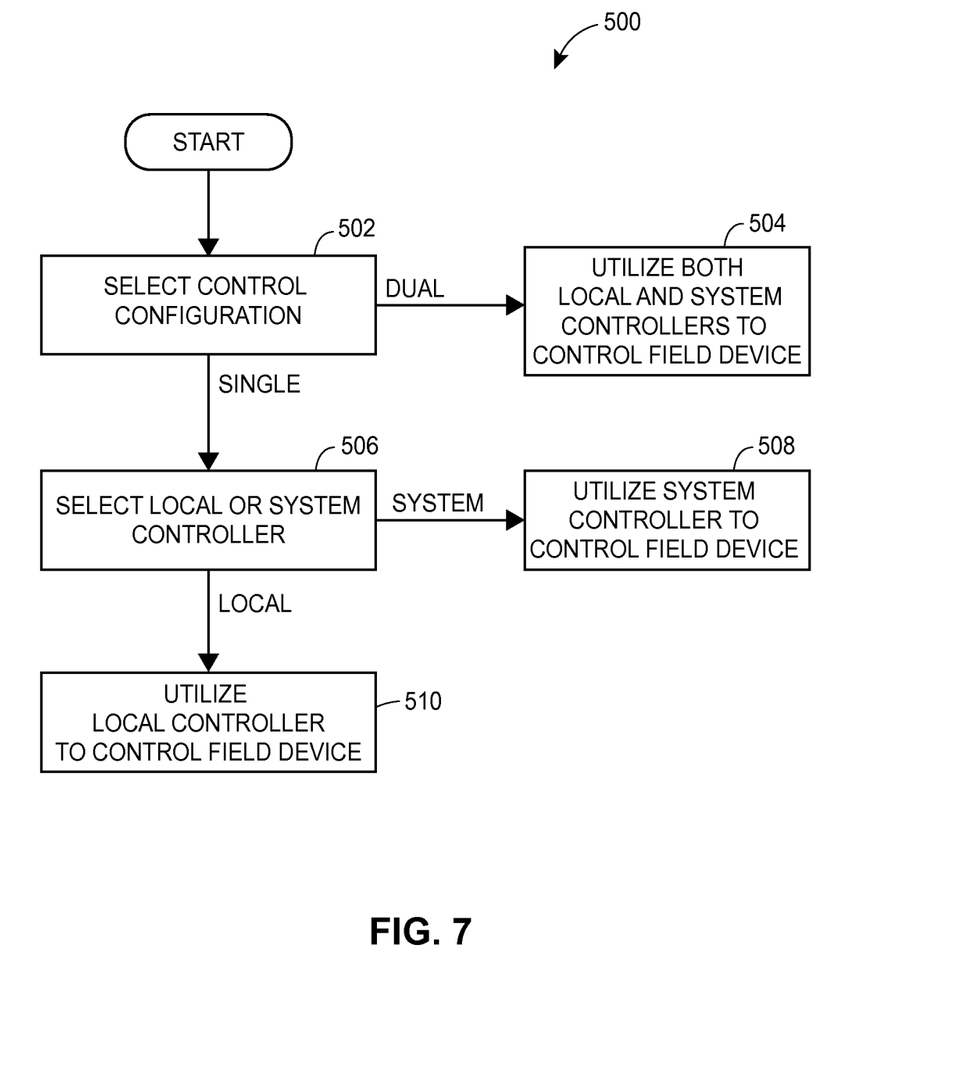
FIG. 7 illustrates an example process flow diagram exhibiting complementary controlling functionality using the control system assembled in accordance with the teachings of the present invention and used to remotely monitor and/or control a field device or control loop.

Further in regard to the complementary control aspect that may be provided by the present invention, FIG. 7 depicts an example process 500 for selecting a control module that may be utilized within the process control system 360 of FIG. 6. In particular, a plurality of control modules may be stored in memory 252 on the wireless output device 352 or coupled thereto. The control modules may be accessible via navigation through a menu tree using a user interface 404 of the wireless output device 352 shown in FIG. 10. Initially, a selection of single or dual control operation of the local control loop 300 and the field device 354 may be chosen at a block 502. Single control operation of the field device 354 will only allow either the remote controller 211 or local controller 310 of the control system 360 to control the field device 354, whereas dual control operation of the field device allows for both the remote and local controllers to contribute to the responsibility of controlling the field device. Upon selection of dual control operation of the field device 354, both the wireless output device 352 and the control system 200 will be responsible for at least some control aspect of the control loop 300 at a block 504. This complementary control capability may facilitate the coordination and optimization of available processing capacity of the control process. For instance, this flexibility may additionally allow for the settings of valve position(s), trigger point(s), dead band, cycle counter alert(s), etc., to be adjusted via the wireless output device 352 or the control system 200. Alternatively, if single control of the field device 354 is desired, selection of the corresponding control module to be executed on by the local processor 250 of the wireless output device 352 or the remote processor 205 of the system controller 211 may be made at a block 506, whereupon either the system controller 211 or the wireless output device 352 will be exclusively responsible for controlling the control loop 300 at blocks 508 and 510, respectively. In any of these control scenarios, the example control module may reside in a computer-readable storage medium, such as a memory, and is able to be executed on by a computer or processing device on either the wireless output device 352 or the system controller 211 (including workstations and computers 213).

Figure 8:
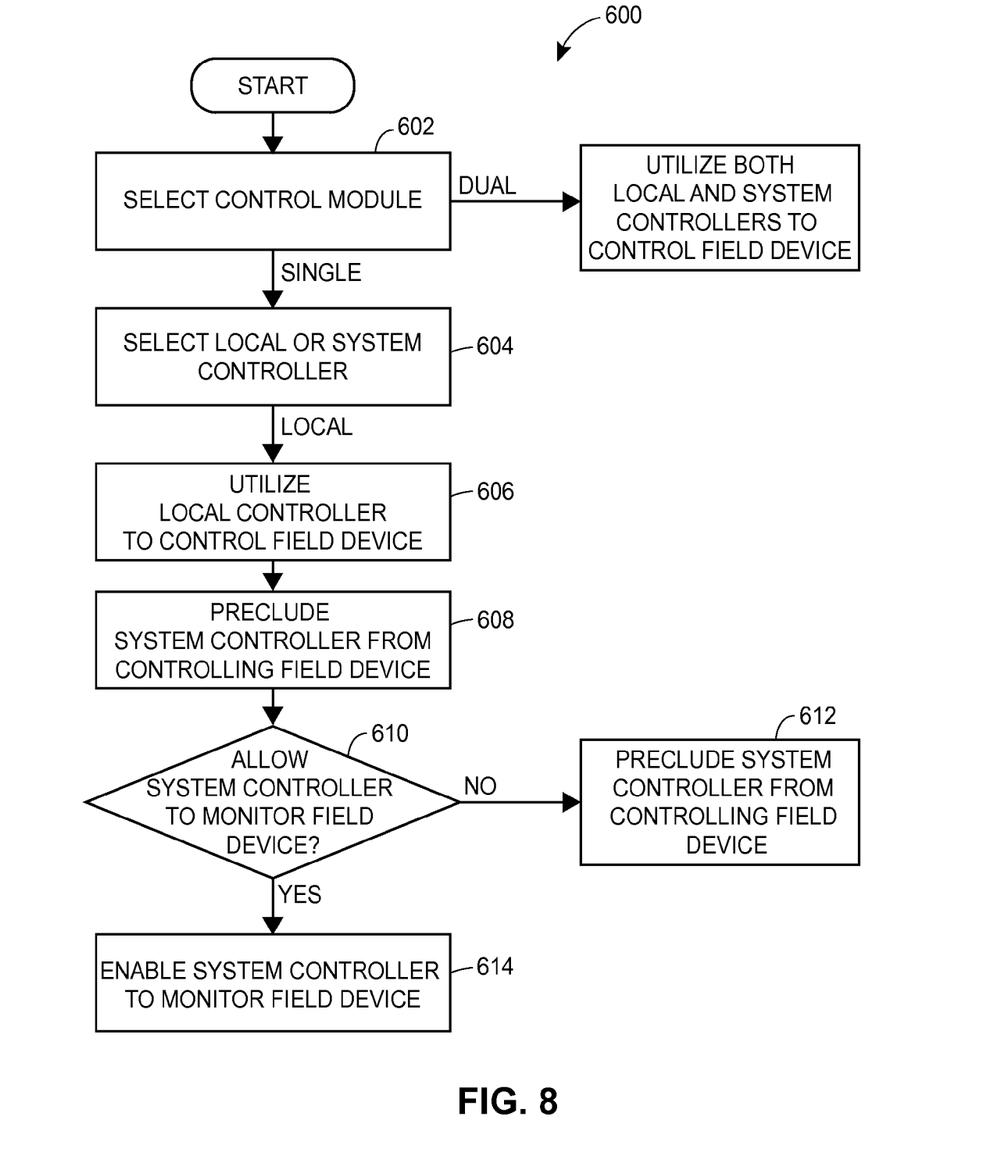
FIG. 8 illustrates an example process flow diagram exhibiting complementary controlling functionality using the control system assembled in accordance with the teachings of the present invention and used to remotely monitor and/or control a field device or control loop.

Additional options of a single or complementary control module for use in the example control system 360 shown in FIG. 6 may also be provided as shown in FIG. 8, wherein an example process 600 for selecting a control module associated with a complementary control configuration is depicted. Initially, a selection of single or dual control operation of the field device 354 may be selected at a block 602. Upon selection of a single control configuration, another selection is made at a block 604 pertaining to which controller to use. If the local wireless output device 352 is selected, the wireless output device will be will be responsible for controlling the control loop 300 at a block 606 and the system controller 211 may not be permitted to control the field device 354 at a block 608. The system controller 211 however may be allowed to monitor the field device 354 upon a selection at a block 610. In this instance, modifications to the control parameters of the local control loop 300 may only be accomplished via the wireless output device 352.

One plant situation where a complementary control routine may be implemented is with partial stroke testing (PST) of an emergency shutdown valve (ESD) in a control loop. During the PST of the ESD, it may be desired to visually observe the testing of the ESD and ensure that it is not interrupted or curtailed. The PST may therefore be conducted and exclusively controlled by the wireless output device 352 near the ESD while control system personnel are able to be present. To prevent modifications or adjustments to the ESD during the PST, the complementary control routine may preclude the system controller 211 from controlling or modifying the ESD, if desired, however the system controller 211 may still be allowed to monitor the ESD. Alternatively, it may be desired for the system controller 211 to be provided with controlling responsibility of the field device 354, while the wireless output device 352 is precluded from controlling the field device 354, but perhaps allowed to monitor the field device 354.

Figure 9:
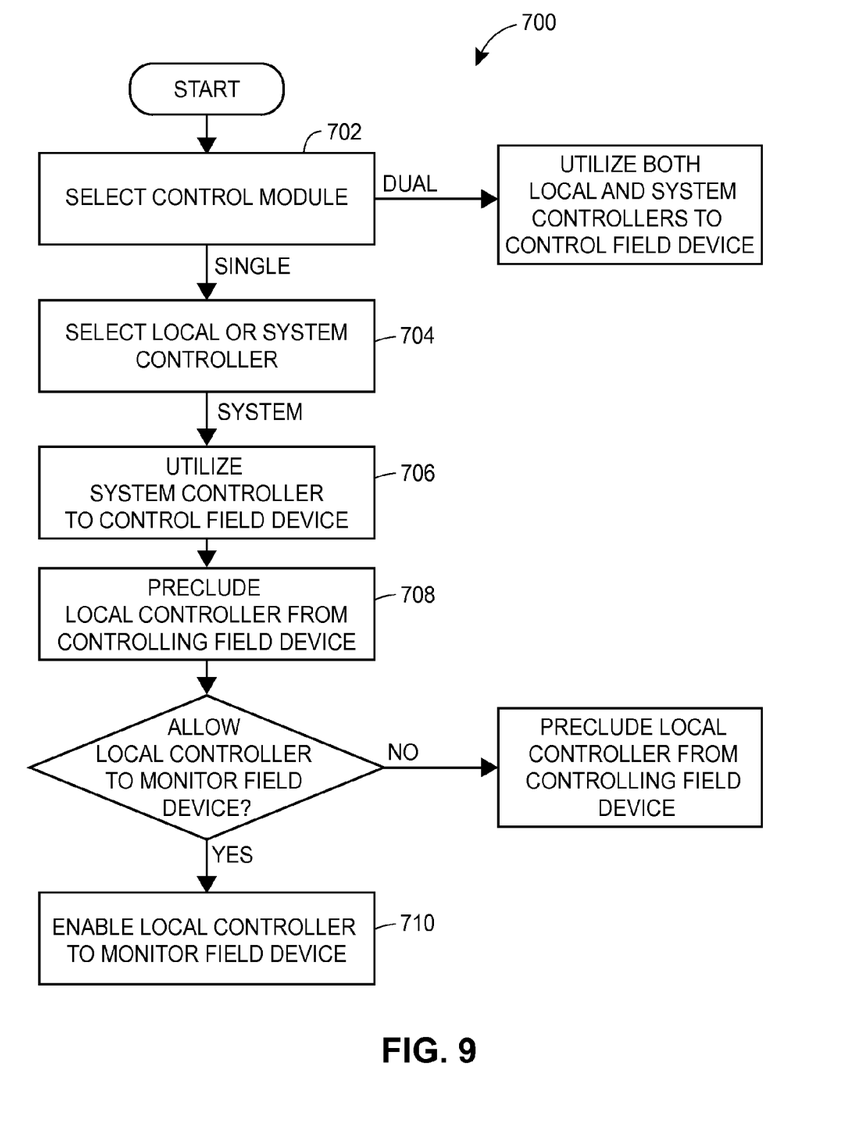
FIG. 9 illustrates an example process flow diagram exhibiting complementary controlling functionality using the control system assembled in accordance with the teachings of the present invention and used to remotely monitor and/or control a field device or control loop.

Another example process 700 for selecting a control module associated with a complementary control arrangement for use in the example control system 360 shown in FIG. 6 is shown in FIG. 9. Initially, a selection of single or dual control operation of the field device may be selected at a block 702. Upon selection of single control, a further selection of the system controller 211 can be made for controlling the field device 354 at a block 704. The system controller 211 will therefore be responsible for controlling the control loop 300 at a block 706. Although the wireless output device 352 was not selected to contribute to the control of the control loop 300, the wireless output device 352 may be permitted to monitor the field device 354, if so desired, at a block 710. In this instance, the control module may provide for the control system 200 to control the field device 354, while the wireless output device 352 may only be permitted to monitor the field device 354, but may not be allowed to control the field device 354. In this configuration, modifications to the local control loop 300 may only be accomplished via the control system 200. Adjustments to the operating parameters of the field device 354 are therefore only able to be made via the remote control system 200, and without the need for control personnel to be present at the local control loop 300.

It is further contemplated that the wireless output device 352, the wireless sensor 356, and the control module 256 may be assembled within a housing. One example embodiment of such a configuration is shown in FIG. 10 and includes a rugged housing 402 designed to meet intrinsically safe and non-incendive requirements. Encased with the housing 402 is the wireless communication module 254 and a power source, for example, a battery (not shown). The housing 402 further includes an antenna and the externally accessible user interface 404 having the output device 406 or display screen mentioned previously. The user interface 404 also includes the previously mentioned at least one input device 408, such as a push-button that may be used for setup or selection of a control module, navigation through a menu tree of control modules, or calibration of the wireless output device 352. The wireless output device 352 may be mounted nearby or directly to the field device 354, for example, pneumatic or hydraulic actuator. In control applications utilizing pneumatic or hydraulic field devices, a multidirectional spool valve 410 may be operatively attached to the housing 402 of the wireless output device 352.

The wireless output device 352 is also capable of monitoring valves, sliding-stem and rotary-shaft actuators, regulators, displacement and float level sensors, and relief valves. The wireless output device 352 may incorporate a magnetic assembly for feedback purposes. The magnetic assembly may be mounted directly to a valve stem of the field device 354, wherein a magnetic field is utilized with a position monitor to sense equipment position of the field device 354. The position monitor may be a true linkage-less non-contacting wireless position transmitter and limit switch that provides a precise wireless feedback signal to indicate equipment position. Additionally, the wireless output device 352 or the control system 200 may acquire additional information from the field device 354, such as valve cycles, valve position, etc., via the non-contacting means of the output device 352.

Through the use of the menu tree and user interface 404 of the wireless output device 352, a desired control module having a complementary control arrangement among the wireless output device 352 and the control system 200 may be selected. The input buttons 408 and the display screen 406 can be used to step through the menu tree and select the desired complementary control module for controlling the field device 354. Multiple control modules may be available for selection, which may reside within the memory of either the control system or the wireless output device 352. In addition, the control module may be available externally via wired or wireless downloading from another source such as handheld devices, memory devices, etc. The selected control module may be executed on by the processor 211 of the system controller 200 or the processor 250 of the wireless output device 352, wherein any combination of complementary control may be utilized between the wireless output device 352 and the control system to control the field device 354.

Figure 11:
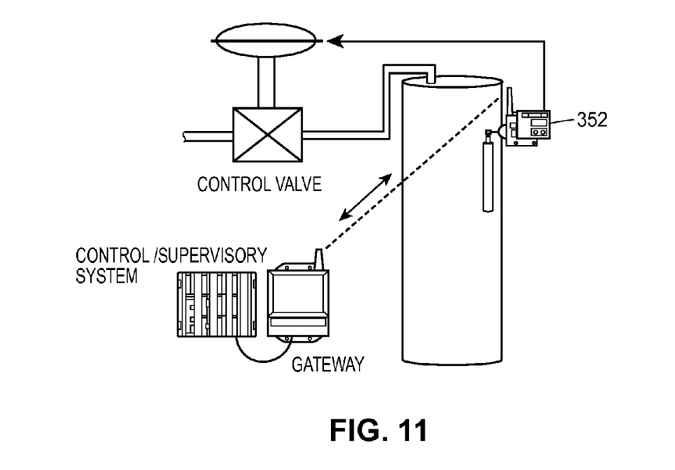
FIG. 11 is a block diagram of a third example embodiment of a process control system assembled in accordance with the teachings of the present invention and used to remotely monitor and/or control a field device or control loop.

Another advantage of the wireless and complementary control aspect over the remote field device described herein is that only one instrument may be required for its measurement and control, as opposed to previous control system configurations that require two instruments, for example, one for level measurement and/or monitoring and one for valve control. For example, the wireless output device 352 shown in FIG. 10 may be incorporated into a control system as shown in FIG. 11. The assembly of the processor 250, sensor 356, control module(s) 256, communication module 254, and control output 410 within a single wireless output device 352 may significantly reduce the time to control the field device 356 as compared to the back-and-forth communication between the controller and the sensor, as well as the controller and the field device, of known control systems. The wireless output device 352 shown in FIG. 10 may therefore be capable of replacing existing pneumatic or hydraulic controllers in the field and providing the control and monitoring benefits described herein. That is, the wireless output device 352 may complement the control responsibilities of a system controller, provide feedback to the system controller, and/or receive changes to control parameters, for example, set-points, from the system controller.

In this regard, faster response times to process changes may be realized by using one instrument wherein signal communication is reduced, as compared to previous control configurations where schedule-based signal transmissions over a communication bus are required between the sensor to the controller, and from the controller back to the field device. Additionally, the wireless control application described herein is easily integrated into the existing infrastructure of the control system, and provides enhanced safety, and improved ease and accuracy of audit reporting.

Figure 12:
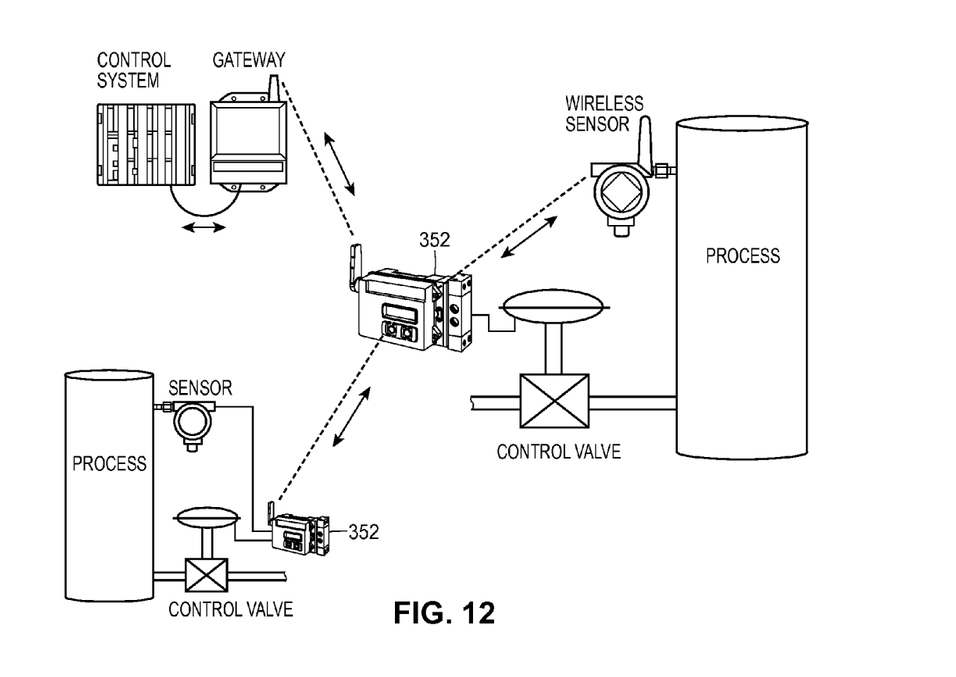
FIG. 12 is a block diagram of a fourth example embodiment of a process control system assembled in accordance with the teachings of the present invention and used to remotely monitor and/or control a field device or control loop.

It is further contemplated that other example embodiments may include monitoring a discrete input and/or output as an event trigger to activate a response. In other words, discrete signal outputs may be employed to send a trigger signal to enable cascading control signals throughout the control system wherein the changing of one control parameter is interlocked or interconnected with another control parameter to cause a change of state. As is shown in FIG. 12, these inputs and outputs may be sent or received wirelessly, and which may pass through a gateway-type intermediary, or alternatively, may be a direct peer-to-peer communication among the control devices. This interconnection between wireless output devices may enable interlocks between the wireless output devices, wherein one device that is tripped to a specific condition may trigger an action by another device.

Control responsibility of a field device between a local loop controller such as the wireless output device and a control system provides for field device parameters to be controlled exclusively by a local control device, exclusively by a control system, or various combinations there between. Control system personnel may therefore no longer be required to go to the site of a geographically isolated control loop to observe, monitor, or modify parameters of its field device. In addition, the local control device and the control system may cooperate to complementary control the field device, or perhaps exclude one or the other from controlling, or monitoring, any portion of control and monitoring responsibilities for a prescribed period of time.

Control modules having complementary control functionality provide control system personnel with increased flexibility to coordinate overall monitoring and control over a specific field device, as well as the entire control system. Another advantage of this flexibility may be realized in the case where the system controller is to be shut down for maintenance service, and the wireless output device may be allowed to assume responsibility for monitoring and controlling the field device until such time as the system controller can be placed back into service. Complementary control within a control system may therefore provide for continued operation of the local control loop during a full or partial suspension of the control system.

One aspect of the present invention is generally directed to a local control loop including a local controller, for example a wireless output device, operatively coupled to a sensor and a field device. The local control loop is capable of being wirelessly coupled to a remote control loop having a remote controller wherein the local controller and the remote controller cooperate to complementary control the field device. A portion of the control process may occur within the local control loop and not in the traditional manner of a control system where back-and-forth communication between the sensor and the remote controller, as well as between the remote controller and the field/control device, is required. The wireless coupling of the wireless output device and the remote control loop may allow for existing stand-alone control loops to be remotely controlled and/or monitored.

Although the above description provides example apparatus and systems including, among other components, software and/or firmware executed on hardware, it should be noted that such systems are merely illustrative and should not be considered as limiting. Accordingly, while this description provides example apparatus and systems, the examples provided are not the only manner to implement such methods and apparatus.

Also, while the control modules described herein have been described as being used in conjunction with Fieldbus and standard 4-20 ma devices, they may, of course, be implemented using any other process control communication protocol or programming environment and may be used with any other types of devices, control modules, or controllers. Although the control modules generally described herein are preferably implemented in software, they may be implemented in hardware, firmware, etc., and may be executed on by any other processor associated with a process control system. Thus, the controller routines described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the Internet, etc.

Thus, while the disclosed methods and apparatus have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. This patent therefore covers all methods, apparatus and articles of manufacture fairly falling within the scope of the appended claims either literally or under the doctrine of equivalents.

What is claimed is:

1. A process control system for controlling a process, the control system comprising:
   a field device associated with the process and arranged to control a process condition;
   a wireless sensor associated with the process and arranged to monitor the process for the occurrence of an event trigger associated with the process condition;
   a remote control system disposed remotely from the field device, the remote control system including a first controller, a first memory, a first processor, and a first wireless communication module, the first wireless communication module coupled to the first processor and permitting wireless communication between the first controller and the wireless sensor;
   the remote control system further including a first control module stored on the first memory and coupled to the first processor, the first control module capable of being executed on the first processor to permit the first controller to place the field device at a first set-point to control the process condition;
   a local control system disposed locally relative to the field device, the local control system including a wireless output device, the wireless output device including a local controller, a local memory, a local processor, and a local wireless communication module coupled to the local processor and arranged to permit wireless communication between the local controller and the first controller;
   a local control module stored on the local memory and coupled to the local processor, the local control module capable of being executed on the local processor to permit the local controller to place the field device at a local set-point; and
   wherein the first controller is further arranged to configure the local control module to permit adjustment of the local set-point.

2. The process control system of claim 1, wherein the wireless output device further comprises an input device operatively coupled to the local processor, and an output device operatively coupled to the local processor.

3. The process control system of claim 2, wherein the input device includes a push-button.

4. The process control system of claim 2, wherein the output device includes a display screen.

5. The process control system of claim 1, wherein the wireless output device includes a housing encasing the local processor, the local memory, the local wireless communication module, and the local control module.

6. A process control system for controlling a process, the process control system comprising:
   a field device associated with the process and arranged to adjust a process condition;
   a wireless sensor associated with the process and arranged to monitor the process for the occurrence of an event trigger associated with the process condition;
   a local control loop operatively coupled to the field device, the local control loop including:
      a local controller having a local wireless communication module coupled to the wireless sensor, the local controller further including a local processor, a local memory, and a local control module;
      the local control module stored on the local memory and capable of being executed on by the local processor, the local control loop arranged to operate in a local control mode in which the local controller monitors the wireless sensor and places the field device at a local set-point determined by the local control module; and
   a remote control loop operatively coupled to the field device, the remote control loop including:
      a remote controller having a remote wireless communication module coupled to the local wireless communication module of the local controller and facilitating wireless communication between the remote control loop and the local control loop,
      the remote control loop further including a remote processor, a remote memory, and a remote control module, the remote control module stored on the remote memory and capable of being executed on by the remote processor, the remote control loop arranged to operate in a remote control mode in which the remote controller monitors the wireless sensor and places the field device at a remote set-point determined by the remote control module;
      the remote control loop further arranged to configure the local control module to remotely alter the local set-point.

7. The process control system of claim 6, wherein the wireless sensor and the local controller are attached to a housing.

8. The process control system of claim 7, wherein the local processor, the local memory, and the local control module are encased within the housing.

9. The process control system of claim 7, wherein the local controller comprises an input device coupled to the local processor, and an output device coupled to the local processor.

10. The process control system of claim 9, wherein the input device includes a push-button.

11. The process control system of claim 9, wherein the output device includes a display screen.

12. A wireless output device for a process control system having a remote wireless communication module and a remote control module, the remote control module stored on a remote memory and capable of being executed on by a remote processor, the wireless output device comprising:
   a processor;
   a memory coupled to the processor;
   a wireless communication module coupled to the processor and facilitating wireless communication with the process control system; and,
   a control module stored on the local memory and capable of being executed on by the processor to place a field device at a local set-point, wherein the wireless output device is configured to control the field device, and wherein the remote processor further arranged to configure the control module to remotely alter the local set-point.

13. A wireless output device of claim 12 further comprising:
   a sensor operatively coupled to the processor, the sensor being responsive to a process condition associated with the field device.

14. A wireless output device of claim 13 further comprising the processor, the memory, the wireless communication module, and the control module being encased within a housing.

* * * * *